May 27, 1952     R. E. PAYNE     2,597,899
SEDIMENTATION TOWER

Filed Aug. 15, 1947     8 Sheets-Sheet 1

INVENTOR
ROBERT E. PAYNE
BY
Hugo G. Kenman
ATTORNEY

May 27, 1952 R. E. PAYNE 2,597,899
SEDIMENTATION TOWER
Filed Aug. 15, 1947 8 Sheets-Sheet 2

INVENTOR
ROBERT E. PAYNE
BY
Hugo A. Kemman
ATTORNEY

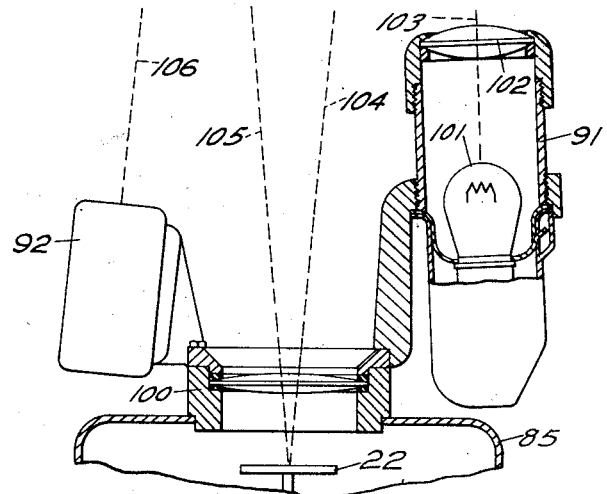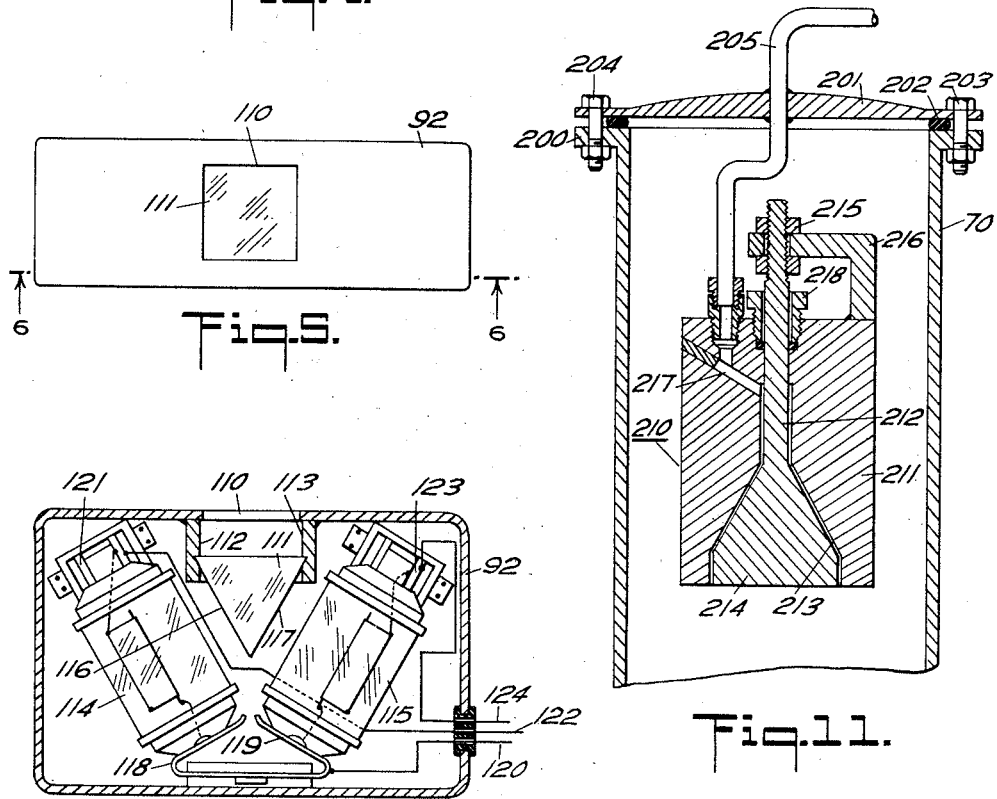

May 27, 1952   R. E. PAYNE   2,597,899
SEDIMENTATION TOWER

Filed Aug. 15, 1947   8 Sheets-Sheet 4

INVENTOR
ROBERT E. PAYNE
BY
Hugo G. Fenman
ATTORNEY

May 27, 1952 R. E. PAYNE 2,597,899
SEDIMENTATION TOWER
Filed Aug. 15, 1947 8 Sheets-Sheet 5
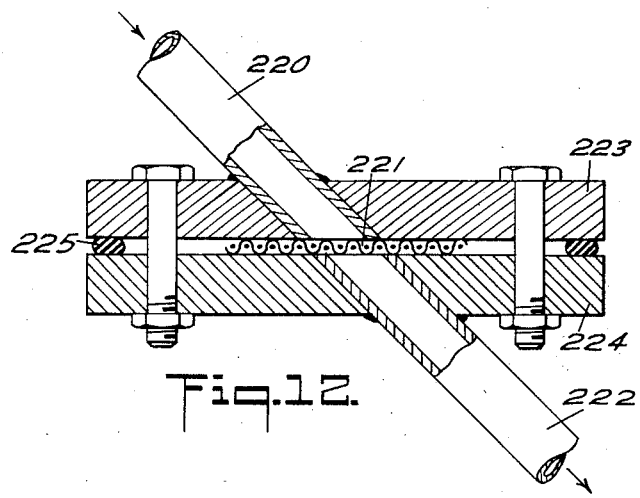
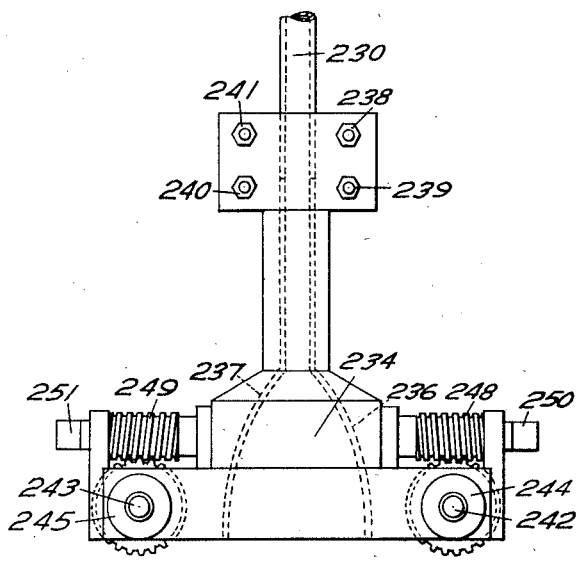
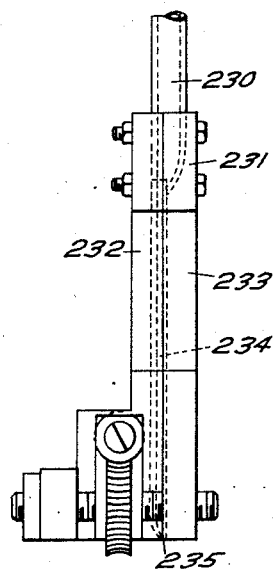
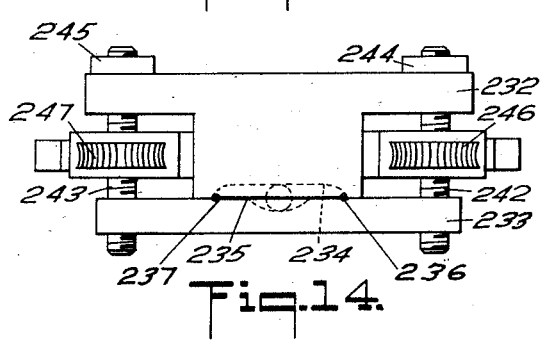
INVENTOR
ROBERT E. PAYNE
BY
Hugo G. Fimman
ATTORNEY May 27, 1952 R. E. PAYNE 2,597,899
SEDIMENTATION TOWER
Filed Aug. 15, 1947 8 Sheets-Sheet 6
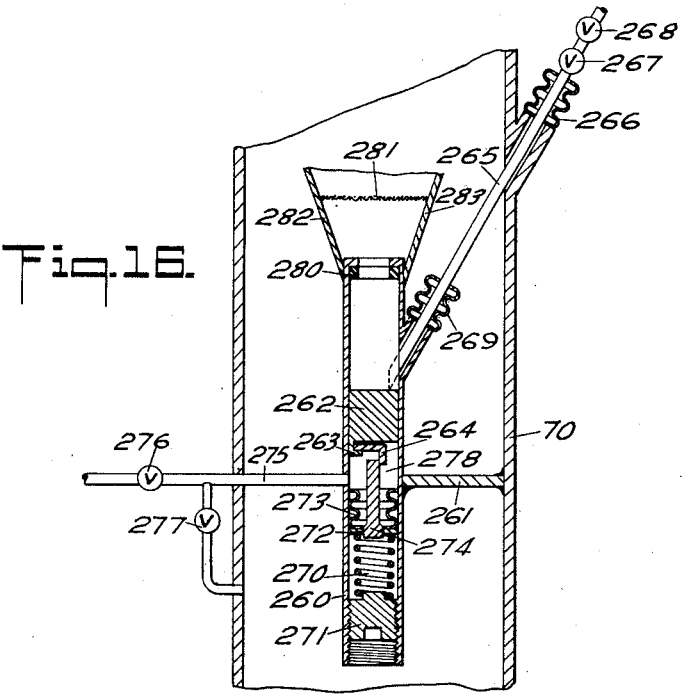
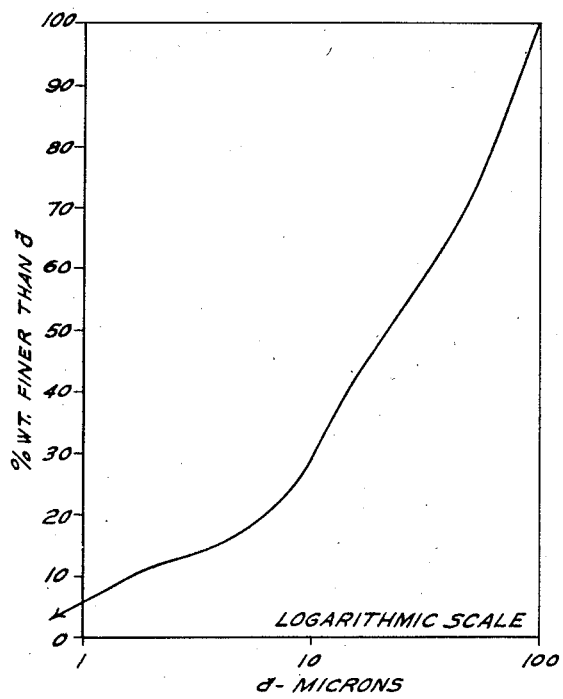
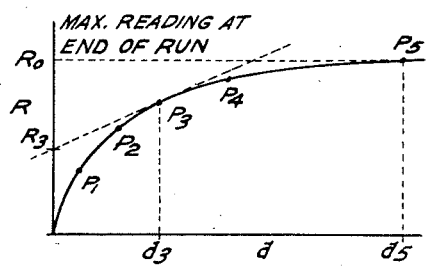
INVENTOR
ROBERT E. PAYNE
BY
Hugo A. Kenman
ATTORNEY

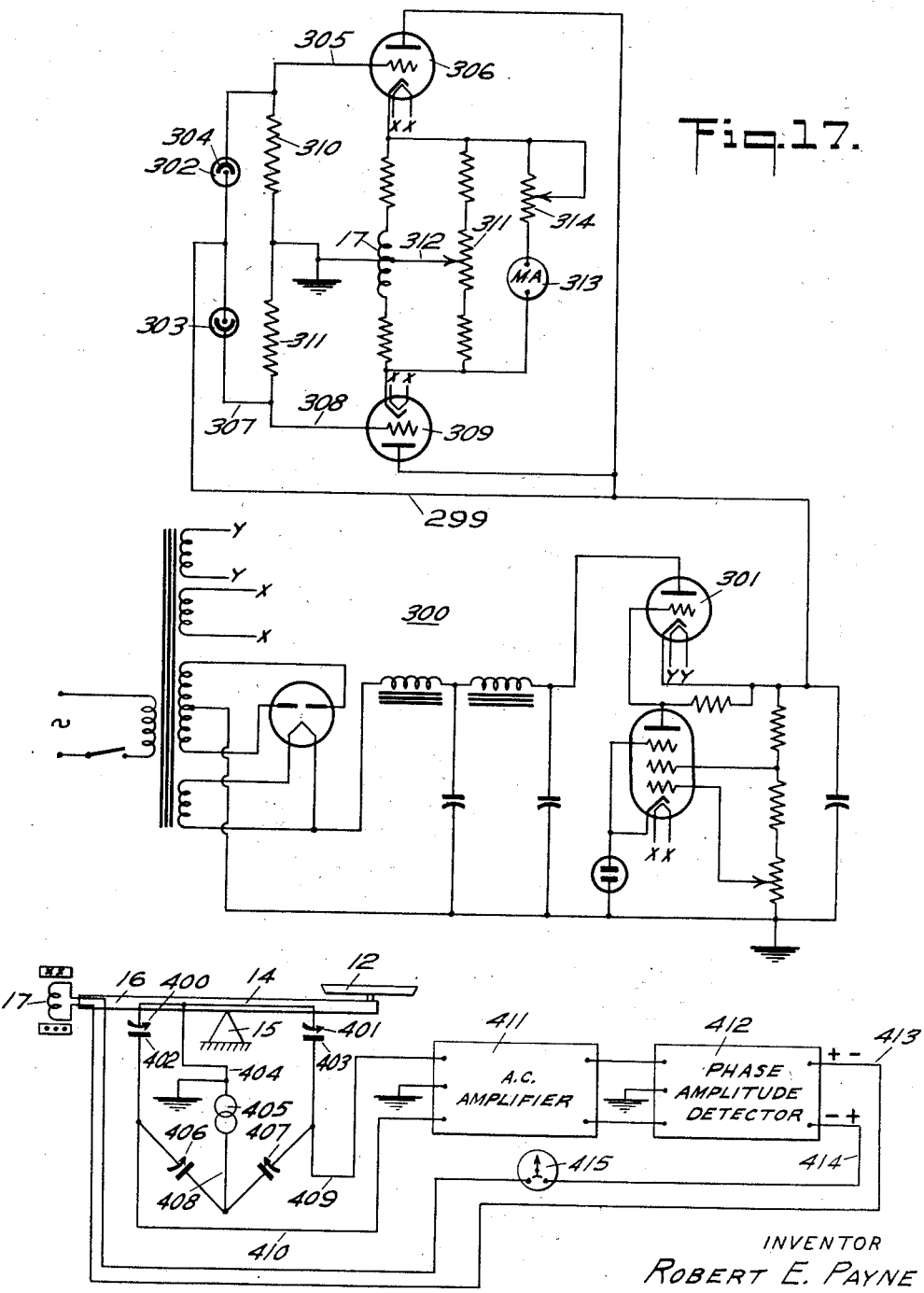

Patented May 27, 1952

2,597,899

UNITED STATES PATENT OFFICE 2,597,899

SEDIMENTATION TOWER

Robert E. Payne, Bywood, Upper Darby, Pa., assignor to The Sharples Corporation, a corporation of Delaware Application August 15, 1947, Serial No. 768,907

9 Claims. (Cl. 73—432)

This invention relates to an apparatus for determining the particle size distribution of powdered or finely divided materials and more particularly for indicating the rate of fall in a gaseous medium of particles of a powdered sample.

An apparatus for determining particle size distribution of finely divided or powdered materials is known. The prior art device for such purpose employs the principles of Stokes law to determine particle size distribution by observing the rate of fall and percentage amount of particles having that rate of fall of a sample of powder initially dispersed in a liquid medium. Such liquid sedimentation devices, as they are known, are enabled to produce useful results but are not completely satisfactory in view of a number of inherent difficulties encountered when endeavoring to measure the rate of fall in a liquid medium. One difficulty is the relatively long period of time necessary for all of the particles dispersed in a liquid medium to settle which therefore prevents a rapid determination of particle size distribution. Another difficulty with the liquid sedimentation apparatus is the tendency of the dispersed particles to aggregate into larger size units. In addition they may stick to the side walls of the liquid sedimentation tank for a time and then be released through the action of fluid currents or mechanical disturbances so as to give an incorrect value of particle size. Still another difficulty with liquid sedimentation devices for measuring particle size distribution is the dsturbing effect of undesired fluid currents introduced into the liquid medium such as convection currents or currents resulting from the movements of a collecting pan or from outside vibrations affecting the liquid containing tank.

It is therefore a principal object of this invention to provide an improved apparatus for measuring the particle size distribution of finely divided materials which will enable the rate of fall and the percentage of the particles having that rate of fall to be indicated in a rapid and accurate manner.

Another object of this invention is to make possible the continuous observation of the percentage of particles having a given rate of fall under any desired conditions of fluid pressure or viscosity consistent with a desired maximum rate of fall for the largest expected particles of any powder sample.

Still another object of this invention is to provide an improved apparatus for the determination of particle size distribution by indicating the rate of fall and percentage of particles having that rate of fall in a gaseous medium such as air under controlled conditions of viscosity, the apparatus being relatively immune to the disturbing effects of fluid currents or vibrational influences and the difficulties arising from the aggregation or reaggregation of the particles initially dispersed in the gaseous medium before they are settled upon the collecting element.

It is also an object of this invention to provide an improved apparatus which will determine particle size distribution by indicating continuously the percentage of particles in a given sample of powder simultaneously and initially introduced at zero time into a gaseous sedimentation tower and falling upon the collecting means over the interval of time from zero time to the time necessary for substantially all of the particles of the sample to fall; and which will enable subsequent indications of subsequent samples of powders to be made in the same manner without removing and cleaning the collecting means of the particles fallen in a previous sample test run.

The apparatus of the invention in its principal embodiment may be briefly described as comprising an enclosure having a vertically extending tube or tower. The enclosure may be constructed of suitable materials such as steel or the like in a manner to be substantially pressure-tight. Suitable valve structures and pressure-indicating devices may be provided in association with the enclosure and vertically extending tank to control, maintain and indicate the gaseous pressure or viscosity conditions within the enclosure either at atmospheric, sub-atmospheric or super atmospheric conditions. Means are also provided in association with the tower to introduce and disperse at the top of the tower in deaggregated form the sample of finely divided material to be analyzed by sedimentation within the tower in a manner not to disturb the desired condition of viscosity of the gaseous medium within the tower.

According to this invention, a collecting means, which may preferably be a weighing pan, is disposed in the bottom of the tower within the enclosure in a manner to receive all of the particles settling through the tower. The collecting means is fastened to one end of a lever arm which may be, if desired, pivoted at or near its center of gravity in any suitable manner such as by a substantially frictionless torsion wire or reed pivot and completely self-contained within the pressure tight enclosure. The other or opposite end of the lever arm may be provided with means to impose a restoring torque or counter torque on the lever arm to maintain equilibrium of the lever arm as the initial torque due to the weight of powder accumulating on the collecting means increases.

It is a feature of the preferred embodiment of the invention that the restoring torque is applied to the lever arm by electrical means so that the electrical signal necessary to produce a restoring torque sufficient to maintain equilibrium of the balance arm is proportional to the amount of powder or particles accumulating on the collecting means. The electric signal indicating means may be positioned exteriorly of the pressure tight enclosure and is usually calibrated arbitrarily, since the information desired to be obtained from the apparatus is of a relative nature to indicate the percentage of particles fallen upon the collecting element at any given time from zero time to the time when all particles have fallen and no further change in weight of the collecting element is observed. If desired, automatic continuous recording means of well known design may be used to record the value of the electric restoring torque signal.

In order to apply automatically the electrical restoring torque to the lever arm, in accordance with variations in weight of the collecting means, a combined optical and photo-electric system for converting mechanical movement of the lever arm into electrical energy together with relay or amplifying means for applying such electrical energy to an electro-magnetic coil in the manner of a servo system may be used as will be described in detail in the preferred embodiment of the invention. In other embodiments of the invention, alternative means may be employed to convert the mechanical movement of the lever arm into electrical energy such as a resistance or capacity bridge, an electro-magnetic coil system, or a system of piezo-electric crystals, it being understood that the electric energy thus generated or obtained is relayed to an electro-magnetic restoring torque coil in a manner to maintain the equilibrium of the lever arm as the particles collect upon the collecting means.

Numerous refinements in the lever arm and associated mechanisms or the relay means may be provided in the system of the invention as will be later described in order to damp the entire measuring and servo system against undesired oscillation or hunting which would impair the accuracy of the results by introducing undesired inertial forces of variable and indeterminant amounts into the system.

As previously mentioned, in the preferred embodiment of the invention, the lever arm is pivotally supported upon a substantially frictionless torsion wire. Means may also be provided to apply a controlled amount of twist and tension to the torsion wire support in order to obtain equilibrium for the lever arm in a desired position at the beginning of a test run regardless of the weight on the collecting end of the lever arm with relation to an existing amount, if any, of electrical restoring torque on the lever arm. In such manner, subsequent test runs of powder samples may be made without opening the tower structure to obtain access to the collecting means to clean it of the powder accumulations of the previous test runs simply by adjusting the twist of the torsion wire at the beginning of the test run to compensate for the accumulated weight of powder from the previous test runs. The provision of the adjustable torsion wire pivot support for the lever arm also enables the equilibrium position for the lever arm at the start of a test run to be adjusted to a position almost imperceptibly past the horizontal position to cause the photo-electric and servo system to produce a full scale meter deflection, which, as the settling powder accumulates upon the collecting means and the lever arm equilibrium position changes almost imperceptibly to pass through the horizontal position, will thus enable meter readings from a starting full scale position and varying over the entire meter range to the opposite scale position to be obtained, assuming the gain of the amplifier connecting the meter and restoring torque coil to the output of the photo-cells to be adjusted to provide such meter deflection range.

In practicing this invention, the sedimentation tower is usually operated with air as the gaseous medium, although it should be apparent that other gases may be used if desired. The temperature and pressure conditions of the gaseous medium are noted in order to determine its viscosity for use in applying the principles of the general settling law or in special cases Stokes' law to translate the meter readings into particle size distribution. With the method and apparatus of this invention the pressure of the gaseous medium may be controlled to provide a desired viscosity which controls the settling rate of any given powder sample to be tested. Normal temperature variations of the gaseous medium have very little effect on its viscosity and may for most practical purposes be ignored. The powder sample to be tested is preferably introduced and dispersed in the form of a small cloud of deaggregated particles at the top of the tower coincidental with the establishment of zero time for the observations to be recorded. If the tower is being operated under atmospheric conditions of pressure, the powder sample may be introduced by a small jet of air, although under sub-atmospheric conditions it is preferable that the powder sample be mechanically forced into the top of the tower in order to produce the desired cloud of particles at the top of the tower. If, however, the powder sample is introduced by a jet of air into the sedimentation tower under vacuum or sub-atmospheric conditions, the powder will be uniformly dispersed throughout the length of the tower and an additional graphical calculation from the observed results must be made as will be later described in detail.

The meter reading at zero time is recorded and subsequent meter readings at short intervals of time from the zero time are also recorded until no further changes in the meter readings are observed, thus indicating the complete settling of all particles of the powder sample. As mentioned before, a continuous recording meter may also be used to instantaneously record meter readings versus time from zero time. In any event, the meter readings are then corrected to zero and normalized to thus be translated into percentage fall of the total sample of powder at any given time from zero time to the time when all particles have settled. The largest particle size settling upon the collecting element at any given time from zero time is given by Stokes' law for atmospheric pressure conditions in the settling tower and by the general settling law for any pressure including atmospheric pressure when the powder sample is introduced in the form of a small cloud at the top of the tower. Stokes' law is $$d = \sqrt{\frac{18\eta h}{Pgt}}$$

where $d$ = particle diameter; $g$ = acceleration of gravity; $\eta$ = viscosity of medium; $h$ = height of settling column; $P$ = true density of powder material, and $t$ = time in seconds from zero time. The general settling law that may be used for any pressure of a gaseous medium in the settling tower is $$t = \frac{9}{2}\frac{P_0}{P}\frac{\bar{u}h}{gd}\frac{1}{a + \frac{d}{2L} + be - c\frac{d}{L}}$$

where $t$ = time to fall through distance $h$
$d$ = particle diameter
$L$ = mean free path of medium
$\bar{u}$ = mean molecular velocity of medium
$P_o$ = density of medium
$P$ = true density of material from which powder is made
$g$ = acceleration of gravity
$a$, $b$, $c$ are constants which depend on powder material and form to a slight extent. For most solid particles the following values may be used: $a = 1.23$, $b = 0.41$, $c = 0.44$
$e$ = base of natural logarithms, constant 2.7182 . . .

By applying the appropriate one of the foregoing laws to the time and percentage data obtained from the sedimentation tower as previously described, a percentage weight of particles having a particle size smaller than a given particle size may be graphically plotted over the entire percentage range of particles so as to determine the particle size distribution of finely divided or powder materials.

This invention further provides that the particles of the powder sample as introduced into the top of an enclosed gaseous sedimentation tower under controlled conditions of pressure or viscosity be collected upon a device enclosed within the bottom portion of the tower and positioned on the end of a lever arm also contained within the tower and enclosure. The lever arm is maintained in equilibrium during the test run by the automatic and continuous application of a counter or restoring torque on the lever arm end opposite the collecting end which restoring torque is in response to the accumulations of the particles on the collecting end. The amount of force necessary to supply the restoring torque is therefore an indication of the accumulated weight of particles on the collecting device. Thus this invention enables the measurement of the percentage amount of particles of different particle sizes falling within the tower from the zero time to be made by devices positioned wholly within the tower and indicated by devices without the tower automatically operated so that the gaseous medium may be undisturbed during the time the particles are settling.

Further objects and advantages of this invention will be apparent with reference to the following specification and drawings in which;

Figure 1 of the drawings is a diagrammatic illustration of the gaseous sedimentation apparatus of this invention and shows the enclosed sedimentation tower, collecting means and associated lever arm, together with the photo-electric system for translating movement of the lever arm into an electrical restoring torque signal indicative of the weight of particles collected;

Figure 4 is an enlarged fragmentary view partially in section of a preferred form of optical assembly including the light source and photoelectric cells as mounted on the bottom portion of the sedimentation tower;

Figure 5 is a top plan view of the photo-electric cell assembly;

Figure 6 is a longitudinal section on the line 6—6 of Figure 5 to show the details of the photoelectric cell mountings and light beam splitting prism;

Figure 11 is a fragmentary partial section of the upper end of the sedimentation tower and also shows in section one form of air feed device for introducing and dispersing the powder sample in deaggregated form within the top of the tower;

Figure 12 is a detail section of a modified form of air feed device employing a screen element for deaggregating the powder sample;

Figure 13 is a side elevation of still another form of air feed device having an adjustable slit opening through which the powder is adapted to be blown in deaggregated form into the top of sedimentation tower;

Figure 14 is an end view as seen from the bottom of Figure 13;

Figure 15 is a top plan view of the feed device shown in Figures 13 and 14;

Figure 16 is a sectional view of an alternative mechanical feed device for introducing and dispersing the powder sample in deaggregated form within the top of a sedimentation tower, the feed device being particularly suitable for use in the gaseous sedimentation tower operated under sub-atmospheric pressure conditions;

Figure 17 is an electrical circuit diagram of a simple form of balanced amplifier shown in block outline in the diagrammatic illustration of Figure 1;

Figure 19 is a diagrammatic illustration of another form of servo system which may be used in the method and apparatus of the invention and shows a capacitor bridge circuit in place of the electro-optical system as shown in Figure 1 to translate the mechanical movement of the lever arm into electrical energy and apply an electro-magnetic restoring torque to the lever arm;

Figure 20 shows a typical curve of the results obtained by a test run of the invention for the analysis of the particle size distribution of silica powder, and Figure 21 is an illustration of a graphical method for computing the results recorded in the manner of Figure 20 when obtained by operating the sedimentation tower at sub-atmospheric pressure together with air feeding of the powder sample into the tower.

Figure 1:
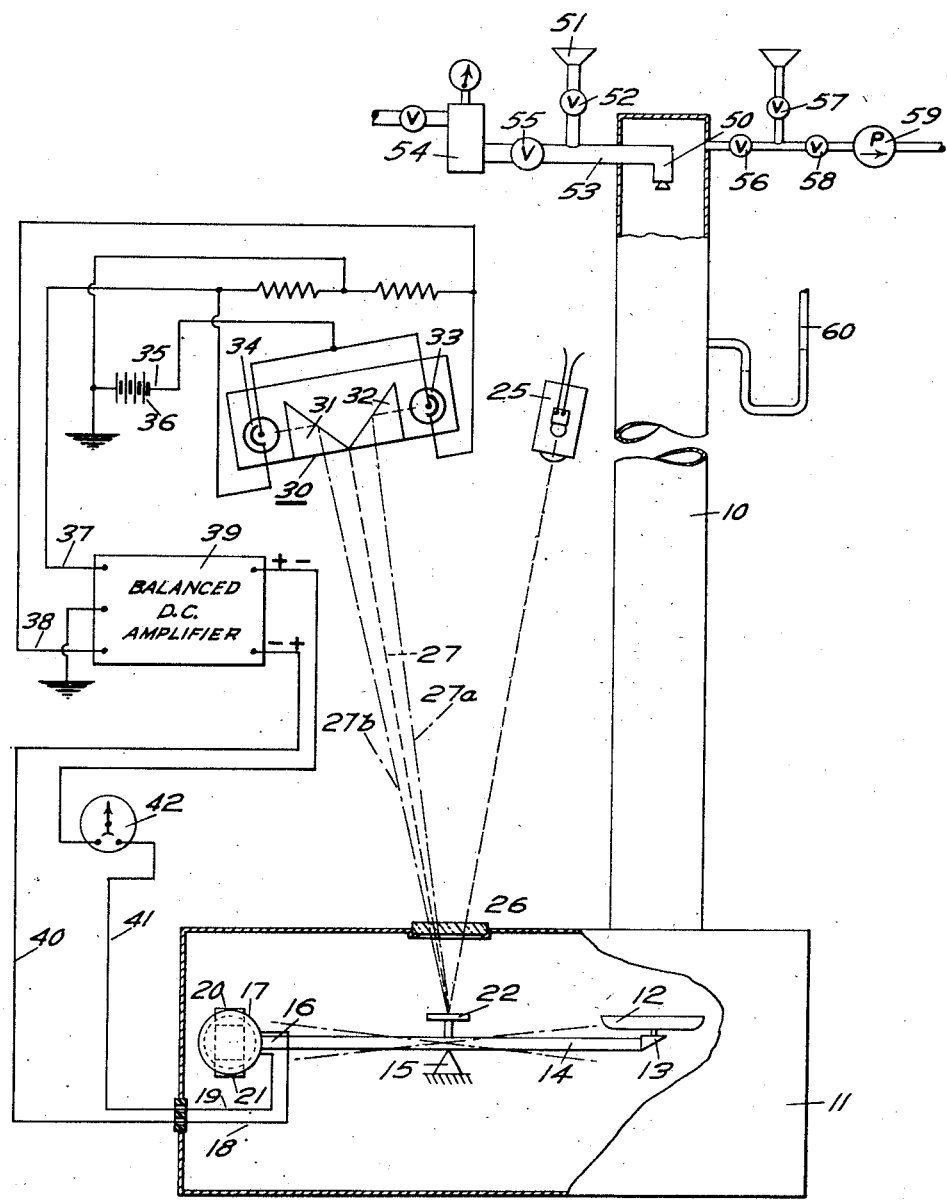

Referring to Figure 1 of the drawings wherein the gaseous sedimentation apparatus of the invention is diagrammatically shown, the completely enclosed sedimentation tower 10 of a known height is provided and may be constructed of suitable material, such as metal, in a manner to be pressure tight, as will be later referred to in detail. The bottom of the sedimentation tower enclosure 10 is enlarged, as shown at 11, to provide space for enclosing the weighing assembly including the collecting means 12 positioned to receive the particles settling through the tower 10. The collecting means 12 is mounted upon one end 13 of a lever arm 14 pivoted at the fulcrum 15. The opposite end 16 of the lever arm 14 is provided with a restoring torque coil of wire 17 having flexible electrical connections 18 and 19 passing through the housing 11 in pressure tight relation.

Figure 9:
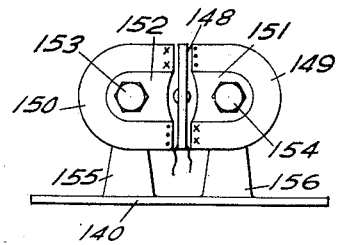
Figure 9 is an end view of the electro-magnetic restoring torque coil assembly associated with one end of the lever arm and shows the permanent magnet structures, all other elements of the assembly being omitted for the sake of clarity in the drawings.

The restoring torque coil 17 is positioned with its axis in an approximate horizontal plane and its coil faces between the opposed and opposite polarity pole faces of a pair of permanent magnets, one of which is shown in Figure 1 to have the pole faces 20 and 21. Such an arrangement of permanent magnets and restoring torque coil is more clearly shown in Figure 9 of the drawings and functions as a servo system electric motor as should be well understood. A light reflecting mirror 22 is mounted upon the lever arm 14 in the vicinity of the fulcrum 15 to be deflected with the lever arm 14 as it is moved towards either of the dotted line positions in response to the application of forces on the lever arm as will be described. It should be understood that the dotted line positions of the lever arm 14 are greatly exaggerated for purposes of illustrating the invention, since the amount of deflection of the lever arm 14, due to the accumulation of particles on the collecting means 12 is practically imperceptible except as may be detected by an automatically responsive servo system such as the photo-electric system or the capacitor bridge system to be described. Furthermore, the servo systems to be described are adapted to supply an electrical signal to the electro-magnetic coil 17 in a manner to apply a restoring torque to maintain equilibrium of the lever arm 14 as the weight of particles on the collecting means 12 increases and thus further limit the movement of the lever arm to be almost imperceptible.

The force measuring servo systems to be described are the subjects of divisional applications Serial No. 277,444, filed March 19, 1952 and Serial No. 277,581, filed March 20, 1952.

In the diagrammatic illustration of one form of the system of the invention as shown in Figure 1, a light source 25 is adapted to project a beam of light through the transparent window or lens assembly 26 onto the light reflecting mirror 22, which reflects the beam of light 27, 27a or 27b depending upon the equilibrium position of the lever arm 14 upon the photo-electric assembly 30. The relative positions of the light source 25 and the reflecting mirror 22 carried by the lever arm 14 may be such that when the lever arm 14 is in the horizontal equilibrium position, the reflected light beam 27 is evenly divided by the prisms 31 and 32 between the photo-electric cells 33 and 34. Upon movement of the equilibrium position for the lever arm 14 to a position other than the horizontal position, with such relative positioning of the light source 25 and reflecting mirror 22, either the photo-electric cell 34 or 33 will receive more light than the other as should be readily understood.

The photo-electric cells 33 and 34 are connected in a circuit with their anodes connected together and to the positive terminal 35 of a battery 36 or other suitable voltage source. The negative terminal of the battery 36 is grounded and connected to the mid point of a voltage divider connected across the respective cathodes of photo-electric cells 33 and 34. Thus, when the lever arm 14 is in the horizontal equilibrium position, the potentials at the respective cathodes of the photo-electric cells 33 and 34 may be equal so that the potentials in lines 37 and 38 connected to the input terminals of a balanced amplifier 39 are also equal with respect to ground. The balanced amplifier may be of any well-known type, an example of which will be described in detail in connection with Figure 17 of the drawings. The amplifier 39 will produce a voltage output of a polarity and amplitude relative to the potential difference in lines 37 and 38 as applied to its input terminals. The output voltage from the balanced amplifier 39 is connected by lines 40 and 41 to the electro-magnetic coil 17 in a manner to create a magnetic field to interact with the field of the permanent magnets and apply a restoring torque on the end of the lever arm 14 to maintain its equilibrium as it is tended to move by the accumulation of particles on the collecting means 12. In effect, the amplifier 39 functions as an impedance matching device between the relatively high impedance of the photo-cells and the low impedance of the restoring torque coil and supplies the necessary restoring torque power.

Although the electro-optical servo system as diagrammatically shown and described thus far is of the type in which the lever arm 14 may be balanced in the horizontal equilibrium position without the application of any electro-magnetic restoring torque or energy in the coil 17, it should be apparent that the system is not necessarily limited to such an arrangement. For example, the fulcrum point 15 may be located at a position other than just above the center of gravity for the lever arm 14, in which case the servo system may be modified, as should be readily understood to provide a continuous restoring torque through the medium of the electro-magnetic coil 17 and associated permanent magnets to maintain the lever arm 14 in a desired equilibrium position at the start of a test run and during the subsequent accumulation of powder upon the collecting means 12.

A meter 42 may be provided in the output circuit of the amplifier 39 connected to the electro-magnetic restoring torque coil 17 to indicate the electrical energy proportional to such restoring torque automatically obtained in response to the tendency of movement of the lever arm 14 and thus indicate the amount of powder collected on the collecting means 12. The meter 42 may be of the micro-ammeter type connected in a manner to measure the current, but it should be understood that any type of device connected to measure electric current or voltage may be used to indicate the restoring torque energy. In any event, the meter may be calibrated arbitrarily from zero to 100, since its deflection is only an arbitrary indication of the amount or percentage weight of particles collected on the collecting means 12 at any interval of time from the zero time to the time when all particles have fallen. The meter may also be calibrated directly in milligrams weight on collecting means, if so desired. A continuous time recording meter of known design (not shown) may also be used in place of the meter 42 as has been previously mentioned.

At the top of the sedimentation tower 10 as diagrammatically shown in Figure 1, a powder feed means 50 for introducing and dispersing in deaggregated form a sample of powder to be analyzed is provided. The feed means 50 may be made in any one of a number of structural forms such as shown in Figures 11 through 16 of the drawings and, as shown diagrammatically in Figure 1, is of the type employing a small jet of air to blow the deaggregated particles of the powder sample into the top of the tower 10. The sample of powder to be analyzed may be placed within the funnel 51 to be passed through the valve 52 into the pipe line 53. A small volume of air contained in the small pressure chamber 54 under pressure may then be released by closing the valve 52 and opening the valve 55 to blow the powder sample in the pipe line 53 through the feed device 50 into the top of the sedimentation tower 10 to form a small cloud of dispersed particles. The feed device 50 is preferably provided with an orifice having a size equal to the largest particle size expected to be present in the powder sample and further having a structure such as to cause deaggregation of the powder sample as it is blown into the top of the sedimentation tower 10.

The above-described feed arrangement and the feed devices hereinafter described form the subject of divisional application Serial No. 771,631, filed September 2, 1947.

It may be desirable to operate the sedimentation tower under conditions of sub-atmospheric pressure in which case the valves 56, 57, 58 and pump 59 may be suitably manipulated in a known manner to control the pressure within the sedimentation tower 10, as indicated by any standard type of pressure or vacuum gauge 60. In place of the simple arrangement of valves 56, 57, 58 and pump 59, automatic pressure regulating systems of any suitable type may be used as should be well understood to maintain a desired condition of pressure within the sedimentation tower enclosure 10 and the enlarged bottom enclosure 11.

The operation of the system of the invention thus far described is as follows. A sample of powder is blown into the top of the sedimentation tower 10 through the powder feed device 50, as previously described. Zero time for the observations to be recorded is established coincident with the time of introduction of the powder sample into the top of the tower. In accordance with the principles of the well-known settling law, the largest particles of powder will reach the collecting device 12 at the bottom of the tower 10 in a very short interval of time after zero time. Prior to the introduction of the powder sample into the top of the tower, the lever arm 14 is adjusted in a manner which will later be referred to in detail, to a condition of equilibrium with the reflected light distributed upon the photo cells 33 and 34 to cause a full-scale or approximately full-scale meter deflection by the meter 42 and a consequent amount of electromagnetic restoring torque by the coil 17 assisting in maintaining the equilibrium of the lever arm 14. As the first particle is collected by the collecting device 12, the equilibrium of the lever arm 14 tends to be disturbed, causing a shift in light distribution on the photo cells 33 and 34 so that the electrical energy output of the balanced amplifier 39 is changed to produce a corresponding change in the restoring torque of coil 17 to maintain the lever arm 14 in equilibrium for the new condition of weight on the collecting device 12. The change in electrical energy is indicated by the meter 42 and may be recorded along with the time lapse from the zero time at which the meter change occurs. Subsequent particles falling upon the collecting device 12 cause subsequent changes in the meter readings and restoring torque and by plotting the meter readings versus time and normalizing the meter readings, such as in a manner to be hereinafter described, a percentage weight indication of particles falling upon the collecting device 12 will be obtained. At some subsequent time from the zero time, a condition will be reached at which the meter deflection no longer changes, which is an indication that all of the particles of the powder sample initially dispersed in the top of the tower have fallen and collected upon the collecting device 12. A specific example of a powder sample test run employing the method and apparatus of this invention will be referred to later in connection with Figures 20 and 21 of the drawings.

Figure 2:
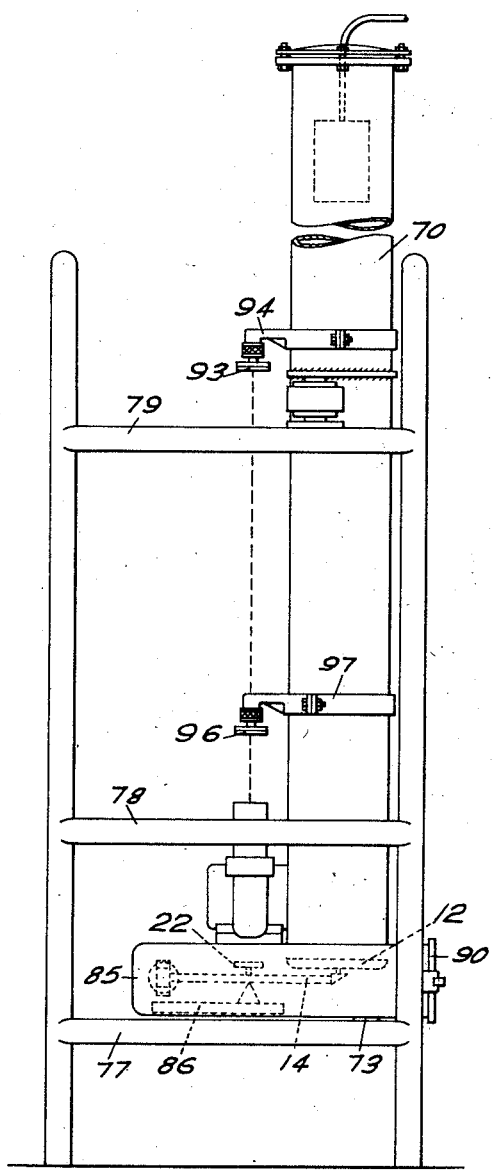
Figure 2 is a side elevation of a preferred form of sedimentation tower structure of this invention and omitting the details at the top of the tower.
Figure 3:
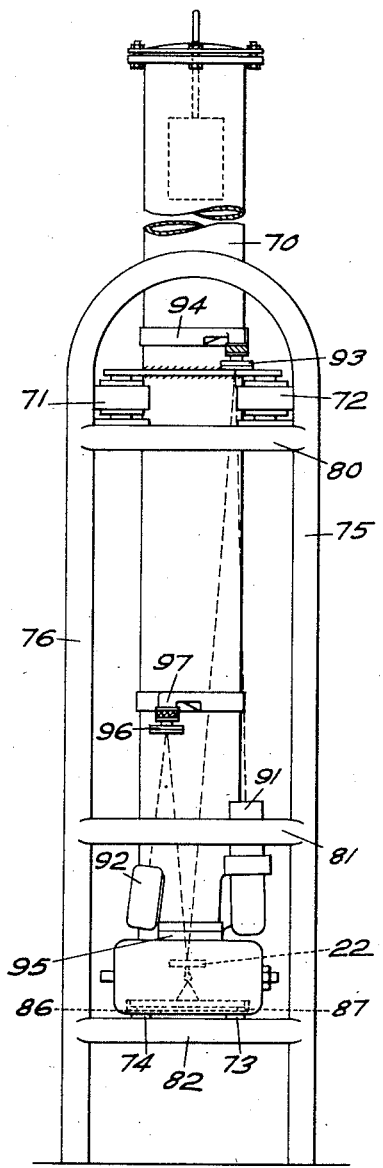
Figure 3 is an end elevation as seen from the left of Figure 2.
Figure 7:
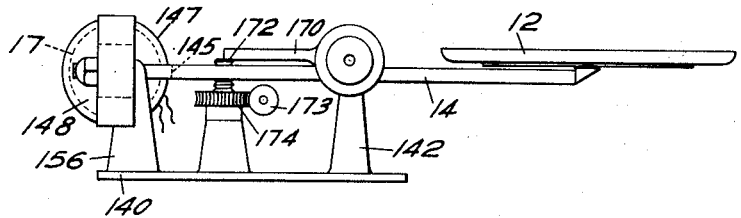
Figure 7 is a side elevation of a preferred structural embodiment of the assembly including the collecting means, lever arm and associated restoring torque coil adapted to be enclosed within the bottom portion of the sedimentation tower.
Figure 8:
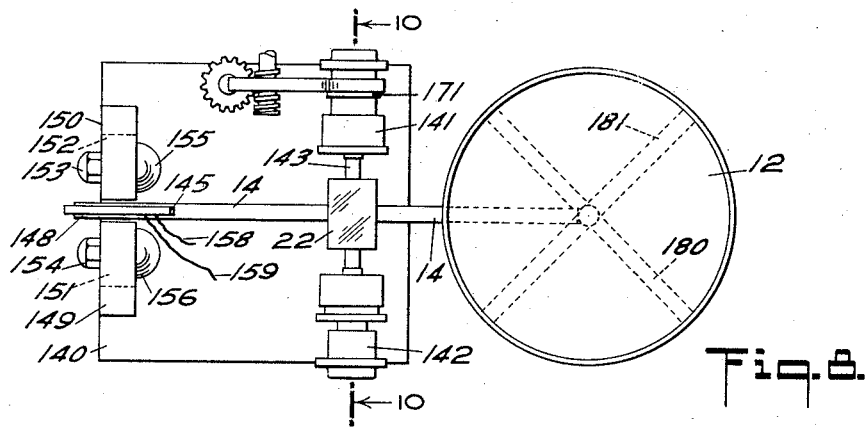
Figure 8 is a top plan view of the assembly shown in Figure 7.
Figure 10:
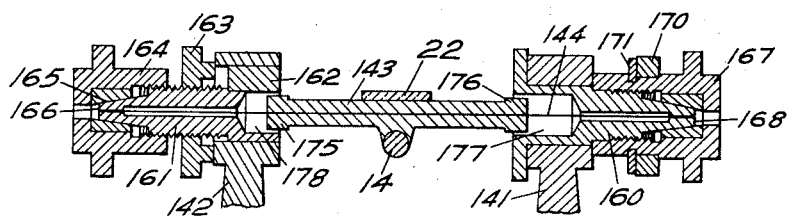
Figure 10 is a longitudinal section on the line 10—10 of Figure 8 to show the assembly details of the torsion wire support for the lever arm.

It is apparent that the specific structures of the various elements diagrammatically shown to be used in connection with the system of the invention may assume various forms without departing from the scope of the invention. With reference to Figures 2 and 3 of the drawings, a preferred structural embodiment for the sedimentation tower of the invention is shown. The tower may be comprised of a vertically extending steel tube 70 adapted to be closed at its upper end in any suitable manner and having means positioned within the tower and near the upper end for introducing and dispersing in deaggregated form a sample of powder to be analyzed in a manner not to disturb a desired condition of pressure for the gaseous medium within the tower. The tower 70 is supported by shock mounts 71, 72, 73 and 74 upon a frame work comprising two pairs of vertically extending members, such as 75 and 76 interconnected by the cross members, such as 77, 78, 79, 80, 81 and 82. It will be understood that all of the cross members are not shown or identified in the drawings, since their assembly and arrangement should be obvious. At the bottom of the steel tube or tower 70 is a substantially rectangular enclosure 85 within which is adapted to be supported upon guide rails 86 and 87 the particle collecting and weighing assembly, with the collecting device or pan 12 shown in dotted lines immediately below the bottom opening of the settling tower 70. The substantially rectangular enclosure 85 is arranged to be airtight and is provided with a door 90 which may be opened to provide access to its interior, in order that the weighing assembly may be removed or that the collecting device 12 may be cleaned.

In the preferred embodiment of the invention being described in connection with Figures 2 and 3 of the drawings, the light source 91 and photo-electric cell housing 92 are mounted on the top of the substantially rectangular housing 85 adjacent the tower 70. A mirror 93 is mounted upon the bracket 94 supported upon the sedimentation tower cylinder 70 to reflect the light rays from the light source 91 down through the window 95 in the rectangular housing 85 to the light reflecting mirror 22 carried by the lever arm 14. The mirror 22 reflects the light beam from mirror 93 to the mirror 96 supported by the bracket 97 from the sedimentation tower cylinder 70, which in turn reflects the light beam upon the photo-electric cells contained in the photo-electric cell housing 92. The specific details of the light source and photo-electric housing together with the associated lens and window arrangement on the rectangular housing 85 are shown in Figure 4.

As shown in Figure 4 of the drawings, the top of the rectangular housing 85 is provided with an opening on its top surface in which is welded in pressure tight relation the lens assembly 100. The opening and lens assembly are positioned to register with the mirror 22 carried by the lever arm 14 (not shown in Figure 4), so that the light beam passing through the lens assembly 100 is focused upon the mirror 22. The light source 91 contains a light bulb 101 and lens 102 for focusing the beam of light 103 upon the mirror 93, shown in Figures 2 and 3 of the drawings, which as previously mentioned reflects a beam of light 104 through the lens assembly 100 onto the instrument mirror 22 carried by lever arm 14. The reflected beam of light 105 from the mirror 22 is in turn reflected by the mirror 96 shown in Figures 2 and 3 of the drawings and distributed as the light beam 106 upon a pair of photo-electric cells mounted within the photo cell housing 92, the light distribution between the two photo cells within the housing 92 being primarily dependent upon the angular position of the instrument mirror 22 and lever arm 14.

With reference to Figures 5 and 6 of the drawings, the details of a preferred embodiment for the photo-electric cell housing 92 are shown. The housing 92 includes an opening 110 through which the reflected light beam 106 from the mirrors 22 and 96 is adapted to pass into the prism 111. The prism 111 is supported (as shown) by the supports 112 and 113 welded to the inner surface of the case 92. Photo-electric cells 114 and 115 are supported with their light sensitive surfaces parallel to the adjacent prism sides 116 and 117, respectively. The anodes of the photo-electric cells are connected to the spring supporting clips 118 and 119, electrically connected together and to a wire 120 passing without the case 92. The cathode of photo-electric cell 114 is engaged by the spring supporting clip 121 electrically connected to the output wire 122, while the cathode of photo-electric cell 115 is similarly connected and supported by the clip 123 to the output wire 124. In such an arrangement it will be seen that if the reflected beam of light 106 from the mirrors 22 and 96 strikes the prism in its exact center, the light will be evenly distributed to the two photo-electric cells 114 and 115, producing equal potentials in lines 122 and 124 with respect to line 120, assuming the photo-electric cells to be connected in the usual manner to a source of direct current, such as a battery. While a preferred arrangement of photo-electric cells and light beam splitting prism has been shown and described in connection with Figures 5 and 6, it should be understood that other arrangements may be equally well-suited to the purpose, or may be used to advantage, such as the photo-electric cell and prism arrangement diagrammatically shown in Figure 1 of the drawings.

In the system of the invention as diagrammatically shown in Figure 1 of the drawings the operation of which has been described, the lever arm 14 was stated to be pivotally mounted at the fulcrum point 15. The invention in its preferred form provides that the pivotal mounting of the lever arm 14 at the fulcrum point 15 be in the nature of a spring or torsion wire pivot, the adjustment of which facilitates the establishment of equilibrium for the lever arm 14 in a desired position at or near the horizontal position at the start of any analytical operation of the invention. The structural arrangement and details of such pivoting mechanism together with the associated lever arm, electro-magnetic restoring torque mechanisms and collecting device are shown in Figures 7 through 10 of the drawings. A substantially rectangular base plate 140 is provided with a pair of pedestal journal supports 141 and 142 mounted thereon, as shown. The lever arm 14 is adapted to be carried by a cross member 143 supported on a torsion wire 144 between the pedestal journals 141 and 142. The collecting device or pan 12 is fastened by welding or otherwise to one end of the lever arm 14 while the other end of the lever arm 14 is slotted at 145 to receive the electro-magnetic restoring torque coil 17 and its supporting form member. The coil 17 may be constructed in any suitable fashion and in the preferred embodiment of the invention the coil is wound within a peripheral slot of the plastic disc 147 forming the coil support form. A thin disc of aluminum 148 may be applied, if desired, to one side of the coil to effect a damping action in the response of the servo system, as will be later referred to, or the coil form itself may be of aluminum. A pair of permanent magnets 149 and 150 are mounted (as shown) with their opposed pole faces of opposite polarity and with the coil 17 therebetween. The magnets may be supported in the position (as shown) in any convenient manner, such as by the plastic inserts 151 and 152 having centrally located bores through which the bolts 153 and 154 extend into engagement with the pedestal supporting members 155 and 156. Flexible wire leads 158 and 159 of very fine diameter wire may be used to electrically connect the movable coil 17 on the end of lever arm 14 to a source of electrical energy providing the restoring torque.

The torsion wire 144 is clamped between threaded spring jaw collets 160 and 161 carried by the pedestal supports 141 and 142, respectively. The threaded collet 161 is prevented from rotation within the pedestal support 142 by means of the slidable key 162 which, however, does permit axial movement of the threaded collet 161 within the pedestal support 142. By adjusting the threaded nut 163, the threaded collet 161 may be moved axially of the pedestal support 142 to apply axial tension to the torsion wire 144. The threaded nut 164 and cam surface 165 are adapted to be manipulated to engage the collet jaw 166 with the end of the torsion wire 144 thus to grip tightly the torsion wire in the collet chuck 161.

The collet chuck 160 is rotatably positioned within the pedestal support 141 and the threaded nut 167 is adapted to tighten the collet jaw 168 upon its respective end of the torsion wire pivot 144. A bell crank or lever arm 170 is keyed to the adjusting nut 167 by the lock washer 171 so that upward or downward movement upon the end of the bell crank 170 will cause a twist tensioning of the torsion wire 144 imposing a force tending to move the lever arm 14 to a new position of equilibrium. The end of the bell crank 170 is adapted to engage the end of a threaded stud 172 which may be moved up and down in accordance with the rotation of the worm and worm gears 173 and 174. The worm 173 may be manually operated by means of a shaft (not shown) extending through the rectangular housing 85 in pressure tight relation. Thus by rotating the worm 173 from without the rectangular housing 85 the torsion wire support 144 may be twisted to establish an equilibrium position for the lever arm 14 regardless of the weight of particles collected upon the collecting device or pan 12, which equilibrium position may be such at the start of an analytical test run as to cause full-scale meter deflection by the associated servo and indicating system.

In designing the collecting and weighing assembly as previously described in connection with Figures 7 to 10 of the drawings, care preferably should be taken to eliminate undesired resonance of the various parts of the system in order that the servo mechanism will operate with a minimum of oscillation or hunting. For instance, the torsion wire support 144 is passed through the relatively stiff cross member 143 connected to the lever arm 14 to thus stiffen the torsion wire 144 and prevent any tendency of the torsion wire to bow or spring with the application of forces thereto, such as by the impinging of particles upon the collecting pan 12. It will also be noted that the cross member 143 is provided with enlarged shoulder portions 175 and 176 at each end which closely fit within the bores 177 and 178, respectively of the collet members 160 and 161, so that up and down spring movement of the torsion wire 144 due to external shocking of the apparatus is limited. The torsion wire support as just described is particularly advantageous in that it is substantially frictionless and responds to the slightest application of torque by the impinging of a particle upon the collecting pan 12.

Since the first particle to fall may fall within a very short time after the establishment of zero time, and since the response of the lever arm 14 is not instantaneous due to a certain inherent inertia and possible resilience of the lever arm, it is apparent that the application of the electromagnetic restoring torque to the coil 17 might occur at an instant when the coil 17 is moving in the same direction as the restoring torque. In such case the restoring torque would not be effective to maintain equilibrium of the lever arm 14, since it would tend to increase the movement of the lever arm rather than cancel the movement. In one form of the invention mechanical damping is employed to prevent an instantaneous lever arm response to the application of the full restoring torque on the lever arm 14. The aluminum disc 148 as previously described functions to provide this damping by acting as an eddy current armature to oppose the movement of the arm. To further damp the system of undesired oscillations, the collecting device or pan 12 may be stiffened by the application of cross braces or straps across its bottom surface (shown in dotted lines at 180 and 181).

Referring to Figure 11 of the drawings, one form of air-operated feed device for introducing and dispersing in deaggregated form a sample of powder to be analyzed, is shown. The top of the cylindrical sedimentation tower 70 is provided with a flange 200 upon which is seated a disc shaped end piece 201. To maintain the pressure tight relation within the tower 70 a rubber gasket 202 may be provided and a plurality of bolts such as 203 and 204 may be employed to assure a tight seating of the end piece 201 against the gasket 202 and flange 200. A tubular conduit 205 passes through the end piece 201 and is welded thereto in pressure tight relation. The conduit 205 is adapted to support within the upper end of the sedimentation tower 70 the feed device assembly 210.

The feed device 210 is comprised of a metallic block member 211 having the axial bore 212 enlarged at its lower end to form a conical opening 213. Within the bore 210 and conical opening 213 is positioned a closely fitting plug 214 of similar contour but of slightly less dimensions. The plug 214 is held in assembled relation to the block 211 by the threaded nut 215 caried by the bracket 216. By adjusting the threaded nut 215 the dimensions of the orifice formed between the opposing conical surfaces of the conical opening 213 and the plug 214 may be correspondingly adjusted. The powder sample and accompanying air blast from the air storage chamber 54 shown in Figure 1 of the drawings is conveyed through the supporting conduit 205 into the pasage way 217, bored in the block 211 to connect with the orifice between the conical surface 213 and plug 214. In order to prevent the blast of powder and air from escaping around the upper end of the block 211, a packing nut 218 is provided. In employing this form of feed device, the nut 215 is adjusted to provide a clearance or orifice between the opposing conical surfaces of the feed device slightly larger than the largest expected particle size of the powder sample. The arrangement of conical surfaces within the feed device together with the use of an air blast to blow the powder through the feed device is effective to deaggregate and thoroughly disperse the powder sample in the form of a cloud within the top of the sedimentation tower 70.

An alternative type of feed device is shown in Figure 12 of the drawings. A mixture of air and powder sample is conveyed through the inlet tube 220 against a fine mesh screen 221 at an angle to the screen such that the smallest expected particle size cannot pass through the screen without striking a screen wire. Therefore all particles and aggregates of particles must strike a cross wire of the screen 221 and be deflected and deaggregated to pass through the screen at right angles to the plane of the mesh screen into the outlet tube 222. The mesh screen 221 may be clamped between a pair of plates 223 and 224 having a sealing gasket 225 to prevent the escape of air and powder around the edges of the plates 223 and 224. Such form of feed device is particularly suitable for use in feeding powder samples containing a large percentage of aggregates which must be deaggregated to prevent clogging in the small orifice feed device. Deaggregation is necessary in order to obtain accurate analytical results from the sedimentation tower. The mesh screen may preferably be of 200 mesh size, although such size is not a limitation since most of the smaller mesh screens presently available have screen openings considerably larger than the largest particle size to be passed in a given powder sample.

Yet another form of air feed device is shown in Figures 13 through 15 of the drawings. This form of air feed device may be termed a slit feed, the width of the slit being determinate of the maximum particle size fed through the device. The conduit 230, in which is conveyed the mixture of sample powder and air under pressure, is clamped at 231 between the plate members 232 and 233 having cut-out or depressed portions in their opposed surfaces to form the passage way 234. The passage way 234 narrows down to a slit 235 at one end of the plates 232 and 233, as shown in Figures 13 and 14 of the drawings. The edges of the depressed surfaces and passage way 235 are defined by the gaskets 236 and 237 which prevent the powder and air under pressure from escaping between the two plates 232 and 233 except at the slit opening 235. The width of the slit 235 is determined by the spacing between the opposed plates 232 and 233 which are tightly clamped together at the end adjacent the feed conduit 230 by means of the bolts 238—241. At the end of the plates 232 and 233 having the slit opening 235, the spacing between the plates is determined by the adjustment of the studs 242 and 243. Studs 242 and 243 are provided with differentially threaded sections at each end, one section engaging corresponding threads in the lower plate 233 and the other section engaging a threaded collar 244 or 245 carried by the upper plate 232. The threaded sections at each end are in the same direction but one end has 50 threads per inch while the other end has 51 threads per inch giving a very high mechanical amplification of slit motion. Each of the studs 242 and 243 have keyed thereon a worm wheel 246 and 247 engaging worms 248 and 249 which may be rotated by the keyed shafts 250 and 251. It should be apparent that rotation of either worm 248 or 249 will adjust the spacing between the opposed plate surfaces 232 and 233 at the slit opening end to thus regulate the width of the slit opening and the maximum particle size to be passed through the opening. The passage way 234, shaped as shown in the dotted lines of Figures 13 to 15, is effective to disperse and deaggregate the powder sample in the form of a cloud within the top of the sedimentation chamber.

In the powder feed devices of the type having orifices through which the powder sample is blown by a jet of air, examples of which have been described in connection with Figures 11 and 13 to 15 of the drawings, very effective deaggregation of the powder sample is obtained due to a viscous sheer force upon the particles as they pass through the high velocity stream of air in the slit. The above will be better understood when it is pointed out that the movement of air in the center of the slit or orifice is of very high velocity while the air movement at the side walls of the orifice is substantially zero.

All of the previous forms of feed devices described in connection with Figures 11 to 15 of the drawings employ a jet of air to blow the powder sample into the top of the sedimentation tower. Under certain conditions of operation it might be undesirable to introduce the powder sample by means of a jet of air. For example, when the sedimentation tower is to be operated under conditions of vacuum, it is apparent that if the powder sample is introduced into the tower by means of a jet of air, the particles would uniformly distribute themselves throughout the tower from top to bottom at the instant of zero time before settling of the particles. While such a distribution would not prevent a determination of the particle size distribution, it would necessitate a graphical computation of the results obtained when the particles are uniformly distributed throughout the tower instead of dispersed in the form of a cloud at the top of the sedimentation tower.

An alternative mechanical feed device may be used to project the powder sample into the top of the tower in the form of a cloud of dispersed and deaggregated particles, without the introduction of an air blast into the tower and regardless of the pressure conditions within the tower. Such a mechanical form of feed projecting device is shown in Figure 16 of the drawings. A cylindrical tube 260 is supported upon an arm 261 welded to the inner wall of the settling tower tube 70. Since the feed device is adapted to project the powder sample upward, it may be positioned at any suitable point within the settling tower 70 beneath the upper end of the tower. Reciprocally mounted within the cylinder 260 is a piston member 262 having a flanged latching surface 263 on its under side. Piston rings (not shown) may be provided to maintain a pressure tight fit between the piston 262 and the inner cylinder walls of the cylinder 260. A pivoted latch member 264 normally engages the latch flange 263, as shown, to prevent the piston 262 from moving upward within the cylinder 260.

A feed tube 265 is adapted to project through the outer wall of the sedimentation tower 70 with a flexible bellows or seal 266 and suitable valves 267 and 268 of the pressure locking type are provided to permit a powder sample to be introduced through the feed tube 265 onto the upper surface of the piston 262 without disturbing a pressure condition within the tower 70, as should be readily understood. The bottom end of the feed tube 265 is passed within the cylinder 260 above the upper surface of the piston 262 by means of the flexible bellows or seal 269. The provision of the flexible bellows 266 and 269 enables the feed tube 261 to be moved inward to the dotted line position to deposit the powder sample exactly upon the center of the upper surface of the piston 262, after which the feed tube may be withdrawn to the solid line position to provide clearance for the piston 262 when it is moved upward within the cylinder 260.

The lower end of the cylinder 260 carries a compression spring 270 seated against an adjustable spring tensioning plug 271 threaded within the bottom portion of the cylinder 260. The upper end of the spring 270 seats against a disc portion 272 of a flexible bellows or seal 273 connected between the inner walls of the cylinder 260. The disc member 272 also carries a trigger element 274 normally engaging, as shown in the drawings, the dependent portion of the latch member 264 and preventing the latch member 264 from pivoting in a clockwise direction to release the piston 262 for axial movement upward within the cylinder 260. A conduit 275 is provided with associated valves 276 and 277 to admit air under pressure into the cylinder chamber 278 defined by the bottom surface of the piston 262 and the flexible bellows and disc member 273 and 272, respectively. When the valve 276 is manipulated to admit air under pressure into the chamber 278, the bellows 273 is moved against the force of the compression spring 270 until the air pressure exceeds the tension of the spring and the trigger member 274 is moved to release the latch 264 for pivotal movement in a clockwise direction. The air pressure within the chamber 278 thus controlled by the tension of the spring 270 is then operative to force the piston 262, now released for axial movement by the clockwise pivotal movement of the latch 264, to move axially upward within the cylinder 260 with considerable velocity. At the upper end of the cylinder 260, the piston strikes the rubber gasket and shock absorbing ring 280 and flings the powder sample on its upper surface upward through the mesh screen 281 towards the top of the tower. The mesh screen 281 is supported on a number of bracket arms, such as 282 and 283 and functions to deaggregate the powder sample as it is projected upward into the top of sedimentation tower 70. By closing valve 276 and opening valve 277 the air pressure within the chamber 278 may be released to allow the piston 262 to fall by gravity and reset the trigger mechanism including the pivoted latch 264 for a subsequent feed of a powder sample.

It should be apparent that other forms of mechanical projecting and feeding devices may be provided to introduce the powder sample in the form of a dispersed cloud of deaggregated particles in the top of the tower without disturbing the conditions of gaseous pressure within the tower, in a manner such as has been specifically described in connection with the feed device shown in Figure 16 of the drawings.

As has been previously described, in connection with the diagrammatic showing in Figure 1 of the drawings, an amplifying device 39 is used to connect the voltage output from the combined photo-electric and optical system to the electro-magnetic restoring torque coil 17 on the end of the lever arm 14 in the manner of a servo system. The amplifier 39 is provided in order to match the relatively high impedance of the photo cells to the low impedance of the electro-magnetic restoring torque coil. An example of one form of amplifying device suitable for such purpose is shown in Figure 17 of the drawings. A voltage regulated D. C. power supply 300 energized from a conventional line voltage alternating current source is provided to supply the operating potentials for the photo electric cells and the amplifying circuit. The voltage regulated power supply is of a conventional design employing a series regulating tube 301 and will not be described in detail, its operation being readily apparent from the circuit shown in Figure 17 of the drawings. The anodes of the photo-electric cells 302 and 303 are connected together and to the positive potential carrying line 299 from the power supply 300. Cathode 304 of photo-electric cell 302 is connected to the control grid electrode 305 of triode 306 and the cathode 307 of photo-electric cell 303 is similarly connected to the control grid electrode 308 of triode 309. Grid return resistors 310 and 311 are conventionally provided in the circuit in association with the photo-electric cells 302 and 303 and tubes 306 and 309. The plate electrodes of tubes 306 and 309 are connected together and to the positive potential carrying line 299. The output loading of tubes 306 and 309 is obtained in their cathode circuits, it being thus apparent that the tubes are connected in cathode follower circuits. In this form of amplifying circuit the electro-magnetic restoring torque coil 17 is center tapped, as shown in Figure 17 of the drawings, the center tap being grounded. The opposite ends of the coil 17 are connected through resistors to a respective one of the cathode electrodes of tubes 306 or 309. The potentiometer 311 having a slider arm 312, grounded as shown, is connected between the two cathode electrodes of tubes 306 and 309, so that by adjusting the position of the slider arm 312, the opposing currents through the two halves of the coil may be made equal. In actual operation it is possible to balance the circuit by adjusting the twist of the torsion element 144 to cause equal potentials for the cathode electrodes and equal currents through the two halves of the coil when the reflected light from the lever arm 14 is evenly distributed upon both photo-electric cells 302 and 303. Therefore, a change in the distribution of the light to photo-electric cells 302 and 303 will cause equal and opposite changes in the potentials on the control grids 305 and 308, so that, in the cathode following circuits, the cathode electrode of tube 306 will assume a potential approximately that of the grid electrode 305, while the cathode electrode of tube 309 will assume a potential approximately that of the control grid 308. Thus a difference in potential will exist between the two cathode electrodes, causing the currents flowing through the restoring torque coil 17 to ground at the center point to be unequal and thus resulting in a net current flow within the coil 17 in a direction to establish an electro-magnetic field and impose a restoring torque upon the lever arm 14 and maintain its equilibrium, as has been previously described. In the circuit arrangement as shown in Figure 17 of the drawings, a micro-ammeter 313 and adjustable series resistance 314 may be connected between the cathodes of tubes 306 and 309 in a voltage measuring arrangement to indicate the potential difference between the two cathodes and hence the relative value of the restoring torque electric signal. It should be obvious that the coil 17 must be connected in a manner to produce an electro-magnetic field of a polarity to produce the restoring torque and that the resultant current flow in the coil 17 may be in either direction, depending upon the direction of shift in light distribution between the two photo-electric cells 302 and 303.

The amplifying circuit arrangement described above in connection with Figure 17 of the drawings is, as has been stated, essentially an impedance matching device and does not provide for any voltage amplification of the voltage output of the photo-electric cells to the electro-magnetic restoring torque coil. In such an arrangement it is preferable that the servo system be damped, as for example by the provision of the aluminum disc 148 in association with the coil 17, as previously shown in Figures 7 to 9 of the drawings, in order to prevent a too-quick response of the restoring torque with relation to the movement of the lever arm 14.

Figure 18:
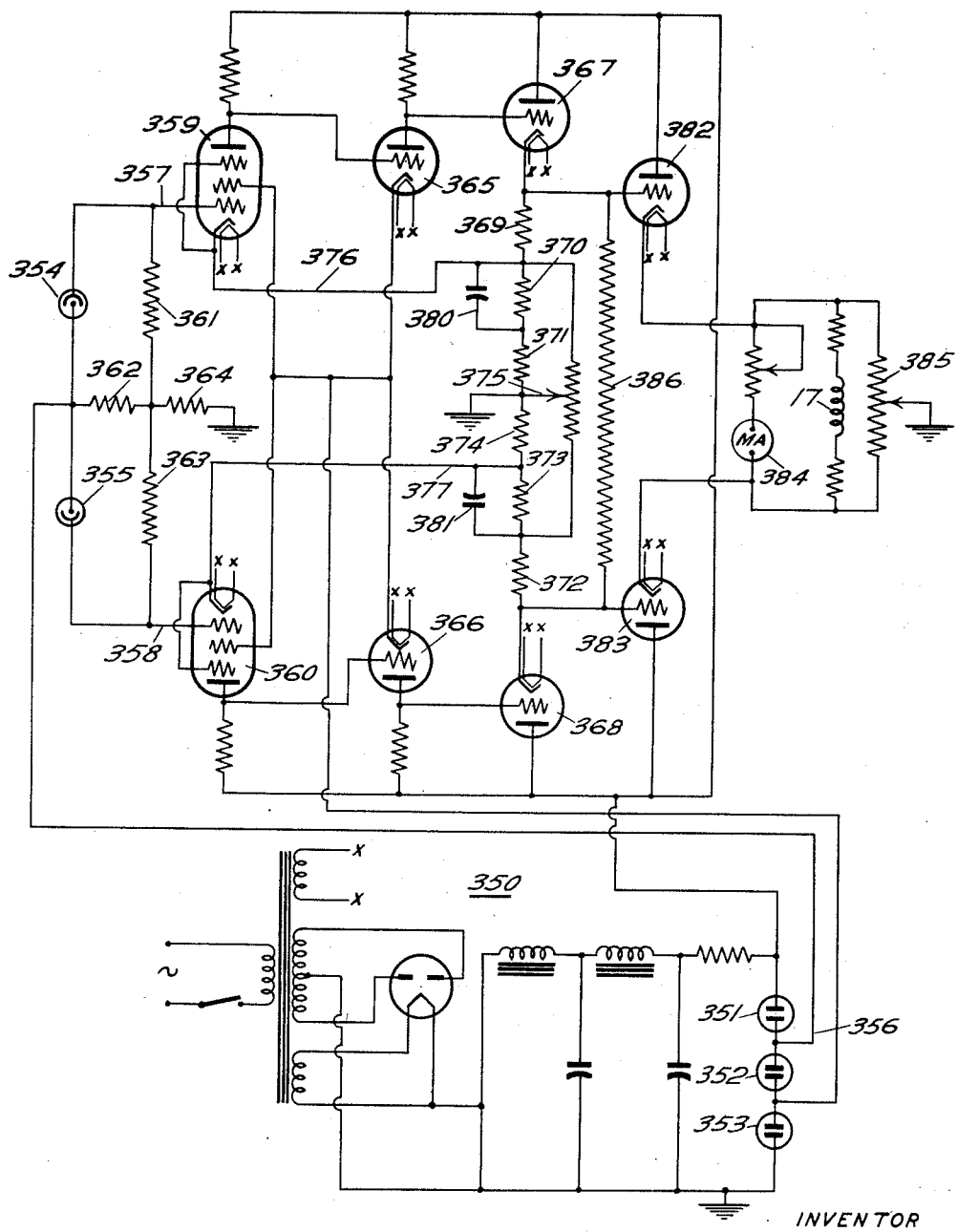
Figure 18 is an electrical circuit diagram of a modified form of amplifier having voltage gain together with controlled voltage feed-back in a manner to provide electronic stabilization of the servo system.

When it is desired to use a modified form of amplifying device having voltage gain, such as shown by the circuit of Figure 18 of the drawings, it is feasible to employ electronic stabilization in place of the aluminum disc 148. The amplifying circuit shown in Figure 18 of the drawings is essentially the same as that previously described in connection with Figure 17 of the drawings, except that a number of direct coupled amplifying stages are connected in cascade between the photo-electric cell output voltage and the cathode follower output circuits connected to the electro-magnetic restoring torque coil. In order to stabilize the high gain amplifier and prevent undesired oscillation, which would be particularly objectionable when the amplification is used in the servo system of the invention, a controlled amount of degenerative voltage feed-back is provided in the amplifying circuit. The degenerative voltage feed-back circuit moreover is designed to provide a frequency dependent variation in gain of the amplifier for the different frequency components of any transient signals that are amplified such that a phase shift for the higher frequency components passed by the amplifier is obtained. This phase shift at higher frequencies may be selected, as is well known in the servo system art, to stabilize the servo system response to all frequencies at which the system would tend to oscillate.

The additional voltage gain as produced by the amplifying circuit of Figure 18 of the drawings is desirable when extreme accuracy in results from the gaseous sedimentation system of this invention is required. By the application of voltage gain the response of the servo system may be made extremely fast, so that the weighing operation can be performed in one one-hundredth of a second or in an even shorter time if desired. This permits the accurate determination of particle sizes which are so large that the particles fall the length of the tower in a fraction of a second. The anodes of photo-electric cells 354 and 355 are connected together and to a positive voltage regulated output tap 356 of the power supply 350. The cathodes of the photo-electric cells 354 and 355 are connected to the control grid electrodes 357 and 358 of vacuum tubes 359 and 360, respectively, and such control grid circuits include resistors 361—364 connected (as shown) to provide the proper grid bias for both tubes 359 and 360. The plates of tubes 359 and 360 are direct coupled in the conventional balanced circuit to the control grids of tubes 365 and 366, respectively, whose plates in turn are direct coupled to the control grids of tubes 367 and 368, respectively. Tubes 367 and 368 are connected in cathode follower circuits such that the output load is in their cathode circuits. The constants of the direct coupled amplifying circuit as described thus far are such as to provide a voltage amplification whereby a one volt swing on the control grids of tubes 359 and 360 will tend to cause a 100 volt swing on the control grids of tubes 367 and 368; however, different amplifications may be required for different speeds of response of the servo system, as should be well understood. In order to stabilize the amplifying circuit against undesired oscillation, a percentage of the voltage output swing of tubes 367 and 368 as appearing in their cathode circuits is fed back to tubes 359 and 360. As is conventional in some types of cathode follower circuits, the potential of the respective cathodes of tubes 367 and 368 follows closely the potential of their control grids and this potential difference appears across the load resistance to ground, such as resistors 369, 370 and 371 or resistors 372, 373 and 374. The ground point 375 is adjustable to provide an initial balance for the circuit, as should be readily understood. The relative values of resistors 369 and 370 or resistors 372 and 373 are such that the potential difference across resistors 373 or resistor 370 is about one one-hundredth that of the potential from the respective cathodes to ground. The proportionate potential across either resistor 370 or 373 is connected by lines 376 and 377 to the cathodes of tubes 359 and 360, respectively, so that as the signal voltage tends to swing on the control grids of tubes 359 and 360 a voltage swing is also produced on their cathodes which is almost equal to the grid voltage swing, thus reducing the amplification of the tubes 359 and 360 by effectively reducing the signal voltage swing on their control grids to be equal to the difference in potential between their control grids and cathodes. In such feed-back circuit, the gain of the amplifier may be said to be equal to the voltage ratio between resistors 369 and 370 which in this case produces an amplifier voltage gain of 100. The gain of the amplifier is not changed by reasonable variations in the other circuit elements. The degenerative voltage feed-back circuit as described also prevents an overloading of tubes 359 and 360 by any excessive variations in voltage output from the photo-electric cells 354 and 355, since the effective signal voltage is determined by the change in potential difference between the control grids and cathodes of tubes 359 and 360.

The voltage feed-back circuit including the voltage dividing resistors 369 and 370 and the connections through lines 376 and 377 to the cathodes of tubes 359 and 360 may be altered by the condensers 380 and 381 to provide somewhat less voltage feed-back in lines 376 and 377 for amplified alternating frequency components. In Figure 18 this effect becomes important for frequencies higher than about 25 cycles per second. Thus, the amplifying circuit will have proportionately more gain for the higher frequency components of signals or pulses associated with a relatively quick response time. As is well known in such amplifying circuits, change in gain is accompanied by a certain amount of phase shift which by the choice of constants for condensers 380 and 381 in association with resistors 370 and 373 will be important in stabilizing the servo system at all frequencies for which instability is possible.

In view of the relatively high impedance of the feed-back network including resistors 369—374 and the condensers 380 and 381, it is desirable to connect the restoring torque coil 17 through the medium of an additional pair of cathode following impedance matching tubes 382 and 383. A voltage measuring device 384 similar to that shown in the circuit of Figure 17 of the drawings is provided to indicate the restoring torque energy due to the flow of current between the respective cathodes of tubes 382 and 383 and a potentiometer 385 may also be provided to adjust the potentials of the cathodes of tubes 382 and 383 to be equal for a given condition of light distribution upon photo-electric cells 354 and 355.

It has been found that a resistor 386 should be connected between the respective cathodes of tubes 367 and 368 in order to provide optimum operation of the servo system employing the voltage gain and feed-back amplifying circuit of Figure 18. The resistance value of the resistor 386 is apparently not critical. The resistor 386 is desirable in order to electrically connect the cathodes of tubes 367 and 368 together and effectively short-circuit the series time constants between the two cathodes as provided by the circuit including resistors 369—374 and condensers 380 and 381.

The gaseous sedimentation apparatus of this invention has been previously described in connection with a preferred arrangement of servo system in which a combined optical and photoelectric system is responsive to tendencies of movement of the lever arm 14 to apply a restoring torque on the lever arm. Other systems may be employed to translate the movement of the lever arm into an electrical signal for use in a servo system having the electro-magnetic restoring torque coil 17 on the end of the lever arm. As an example, the lever arm 14 may be connected in a capacitor bridge circuit, as shown in Figure 19 of the drawings. Details of the lever arm, fulcrum, collecting means, and electro-magnetic restoring torque coil are the same as shown and described in connection with Figure 1 of the drawings and will be given the same reference numerals without further discussion here. Associated with each end of the lever arm 14 for movement therewith is a respective capacitor plate 400 or 401. Capacitor plates 400 and 401 are associated with fixed capacitor plates 402 and 403, respectively. Capacitor plates 400 and 401 are connected together and to one terminal 404 of a source of alternating current 405. Capacitor plates 402 and 403 are connected, respectively, to one terminal of the variable condensers 406 and 407 whose other terminals are connected together and to the other terminal 408 of the alternating current source 405. The values of the condensers in the bridge circuit as described are selected to provide maximum bridge sensitivity by conventional means. A relatively high frequency is provided by oscillator 405 in order to obtain usable impedance values in the bridge circuit. Variable condensers 406 and 407 may be adjusted in order that the capacitor bridge circuit may be balanced for a given equilibrium position of the lever arm 14. The unbalanced alternating current output of the bridge circuit appears across lines 409 and 410 and is amplified by the alternating current amplifier 411 and detected by the phase amplitude detector 412. The amplifier 411 and phase amplitude detector 412 may be of conventional design well known in the art and are therefore shown in block outline in the diagrammatic illustration of Figure 19. The phase amplitude detector 412 provides a D. C. output across lines 413 and 414 of a magnitude and polarity as determined by the comparative amplitude and phase of the alternating current unbalanced bridge output in lines 409 and 410 with respect to ground. The restoring torque coil 17 is connected to the D. C. output in lines 413 and 414 in a manner to apply a restoring torque to maintain equilibrium for the lever arm 14 as the weight on the collecting pan 12 increases and the balanced or unbalanced condition of the capacitor bridge circuit is changed. This restoring torque could also be obtained by connecting (in a manner not shown) the D. C. output from lines 413 and 414 respectively to the stator plates of condensers 400 and 401 to make use of the electrostatic forces between condenser plates to maintain equilibrium. In operating the capacitor bridge circuit, it is preferable that the condensers 406 and 407 be adjustable to balance the bridge when the lever arm is in the horizontal equilibrium position so that a subsequent adjustment of the torsion wire support for the fulcrum 15 may produce a full-scale meter deflection for the torque energy indicating meter 415 at the start of the test run, as previously described.

The following results may be given as an example of a test run of the apparatus of the invention for determining particle size distribution of a sample of silica powder. An air feed device of the conical type shown in Figure 11 may be employed to introduce the powder sample into the top of the tower. The results tabulated below were obtained by initially adjusting the torsion wire support to cause full scale meter deflection. The test run was made at atmospheric pressure and was continued for a time duration of 85,800 seconds (longer than usually needed for most powder samples) at which time no further meter deflection was observed, thus indicating complete settling of all powder particles. The meter readings were corrected to zero and normalized to indicate percentage weight, as shown in the tabulations listed below. The maximum particle size for listed percentage weights at specified time intervals from zero time were computed by Stokes' law, since the gaseous medium in the tower was maintained at atmospheric pressure during the test run.

| Time—Seconds | Meter Reading | Subtract to 6.3 to Correct to 0 | Divide by 93.7 to Correct to 100% (Normalization) | Compute by Stokes' Law Diameter from Time, d-microns |
|---|---|---|---|---|
| | | | Per cent weight finer than d | |
| 0 | 100 | 93.7 | 100 | ∞ |
| 4 | 95 | 88.7 | 94.6 | 87 |
| 8 | 80 | 73.7 | 78.6 | 61.5 |
| 13 | 70 | 63.7 | 68.0 | 48 |
| 20 | 65 | 58.7 | 62.6 | 39 |
| 34 | 60 | 53.7 | 57.3 | 30 |
| 53 | 55 | 48.7 | 52.0 | 24 |
| 84 | 50 | 43.7 | 46.6 | 19.2 |
| 133 | 45 | 38.7 | 41.3 | 15.2 |
| 192 | 40 | 33.7 | 36.0 | 12.6 |
| 285 | 35 | 28.7 | 30.6 | 10.3 |
| 433 | 30 | 23.7 | 25.3 | 8.4 |
| 748 | 25 | 18.7 | 20.0 | 6.4 |
| 1,213 | 22.5 | 16.2 | 17.3 | 5.0 |
| 2,550 | 20 | 13.7 | 14.6 | 3.45 |
| 6,900 | 17.5 | 11.2 | 12.0 | 2.11 |
| 10,800 | 16.2 | 9.9 | 10.6 | 1.67 |
| 17,000 | 13.7 | 7.4 | 7.9 | 1.33 |
| 21,000 | 12.0 | 5.7 | 6.1 | 1.20 |
| 27,500 | 11.0 | 4.7 | 5.0 | 1.05 |
| 85,800 | 6.3 | 0 | 0.0 | 0.59 |

The above results may be graphically represented by a curve, as shown in Figure 20 of the drawings. In such graphical representation, the particle size diameter $d$ in microns is plotted along the abscissa with small particle sizes to the left, while the percentage weight of particles having a diameter finer than $d$ is plotted along the ordinate with zero percentage at the bottom.

As has been previously described, it may be desirable to shorten the length of time necessary for all of the particles in the powder sample to settle, by operating the tower under subatmospheric conditions of pressure. Under such conditions of operation it is necessary when computing the particle size diameter in microns for a given time lapse from zero time to use the general settling law instead of the simplified Stokes' law, which is true only for atmospheric conditions of pressure. Moreover, when operating the tower under sub-atmospheric conditions of pressure and employing an air feed device which substantially uniformly distributes the powder sample throughout the settling tower co-incident with zero time, it is necessary to compute the results for such particle distribution graphically. In Figure 21 of the drawings the graphical computation method is illustrated wherein the diameter of the particles as determined from the general settling law is plotted along the abscissa starting with zero at the left and the arbitrary corrected meter readings for the corresponding particle sizes are plotted along the ordinate starting with zero meter reading at the bottom. The true percentage values may then be obtained by constructing tangents to the curve representing pairs of meter readings and diameters. The intercept of the tangent on the ordinate will then indicate the true percentage weight of powder having the particle size finer than the size $d$ indicated at the tangent point on the curve. For example, at a point $P_3$ on the curve representing a particle size $d_3$ a tangent is drawn to intercept the axis at the point $R_3$. Percentage weight $W_3$ will then be obtained by the following formula:

$$\%W_3 = 100\left(1 - \frac{R_3}{R_o}\right)$$

The percentage weight and particle size may then be graphically plotted as previously shown in Figure 20 of the drawings.

It should be obvious that various modifications of the gaseous sedimentation apparatus of this invention will occur to those skilled in the art without departing from the spirit and scope of the appended claims.

I claim:

1. Apparatus for indicating the particle size distribution of powder samples comprising, an enclosure including a sedimentation tower of known height adapted to contain a gaseous medium, means for forming a cloud of dispersed and deaggregated particles of the powder sample at the top of said gas-containing tower, a lever arm pivotally supported within the bottom portion of said enclosure, collecting means supported on one end of said lever arm in a position to receive the particles settling through said tower, a servo system for generating a force to maintain equilibrium of said lever arm as the weight of particles on said collecting means increases, and means to indicate the value of said force with respect to settling time of the particles.

2. Apparatus for indicating the particle size distribution of powder samples comprising, an enclosure including a gas-containing sedimentation tower of known height, said tower and enclosure having means to maintain a desired condition of viscosity for the gaseous medium within the tower during the sedimentation of a powder sample, means for forming a cloud of dispersed and deaggregated particles of the powder sample at the top of said tower, a lever arm pivotally supported within the bottom portion of said enclosure, collecting means supported on one end of said lever arm in a position to receive the particles settling through said tower, a servo system for generating a force to maintain equilibrium of said lever arm as the weight of particles on said collecting means increases, and means to indicate the value of said force with respect to settling time of the particles.

3. Apparatus for indicating the particle size distribution of powder samples comprising, an enclosure including a sedimentation tower of known height adapted to contain a gaseous medium, means for forming a cloud of dispersed and deaggregated particles of the powder sample at the top of said gas-containing tower, a lever arm pivotally supported on a torsion wire pivot within the bottom portion of said enclosure, means to adjust the twist tension of said torsion wire to produce a desired equilibrium condition for said lever arm, collecting means supported on one end of said lever arm in a position to receive the particles settling through said tower, a servo system for generating a force to maintain equilibrium of said lever arm as the weight of particles on said collecting means increases, and means to indicate the value of said force with respect to settling time of the particles.

4. In an apparatus for the determination of particle size distribution of a powder sample, an enclosure including a vertical gas-containing sedimentation tower having provision for introduction of a powder sample into the upper portion thereof, weighing scale means arranged within the bottom portion of said enclosure to receive the particles settling through said tower, a servo system for generating and applying to said weighing scale means a restoring force as the weight of the collected particles increases, and means to indicate the value of said force with respect to settling time of the particles.

5. In an apparatus for the determination of particle size distribution of a powder sample, an enclosure including a vertical gas-containing sedimentation tower having provision for introduction of a powder sample into the upper portion thereof, a fulcrumed balance member within the bottom portion of said enclosure, collecting means on said member at one side of its fulcrum in a position to receive the particles settling through said tower, a servo system for generating and applying to said member at the opposite side of its fulcrum a force to maintain equilibrium of said member as the weight of the collected particles increases, and means to indicate the value of said force with respect to settling time of the particles.

6. In an apparatus for the determination of particle size distribution of a powder sample, an enclosure including a vertical gas-containing sedimentation tower having provision for introduction of a powder sample into the upper portion thereof, a fulcrumed balance member supported on a torsion wire fulcrum within the bottom portion of said enclosure, means to adjust the twist tension of said torsion wire to produce a desired equilibrium condition for said member, collecting means on said member at one side of its fulcrum in a position to receive the particles settling through said tower, a servo system for generating and applying to said member at the opposite side of its fulcrum a force to maintain equilibrium of said member as the weight of the collected particles increases, and means to indicate the value of said force with respect to settling time of the particles.

7. In an apparatus for the determination of particle size distribution of a powder sample, an enclosure comprising a bottom compartment and a vertical gas-containing sedimentation tower extending upward from said compartment and communicating therewith, said tower having provision for introduction of a powder sample into the upper portion thereof, weighing scale means arranged within said compartment to receive the particles settling through said tower, a servo system for generating and applying to said weighing scale means a restoring force as the weight of the collected particles increases, and means to indicate the value of said force with respect to settling time of the particles.

8. In an apparatus for the determination of particle size distribution of a powder sample, an enclosure comprising a bottom compartment and a vertical gas-containing sedimentation tower extending upward from said compartment and communicating therewith, said tower having provision for introduction of a powder sample into the upper portion thereof, a fulcrumed balance member within said compartment, collecting means on said member at one side of its fulcrum in a position to receive the particles settling through said tower, a servo system for generating and applying to said member at the opposite side of its fulcrum a force to maintain equilibrium of said member as the weight of the collected particles increases, and means to indicate the value of said force with respect to settling time of the particles.

9. In an apparatus for the determination of particle size distribution of a powder sample, an enclosure comprising a bottom compartment and a vertical gas-containing sedimentation tower extending upward from said compartment and communicating therewith, said tower having provision for introduction of a powder sample into the upper portion thereof, a fulcrumed balance member supported on a torsion wire fulcrum within said compartment, means to adjust the twist tension of said torsion wire to produce a desired equilibrium condition for said member, collecting means on said member at one side of its fulcrum in a position to receive the particles settling through said tower, a servo system for generating and applying to said member at the opposite side of its fulcrum a force to maintain equilibrium of said member as the weight of the collected particles increases, and means to indicate the value of said force with respect to settling time of the particles.

ROBERT E. PAYNE.

REFERENCES CITED

The following references are of record in the file of this patent:

UNITED STATES PATENTS

| Number | Name | Date |
|---|---|---|
| 529,587 | Brennan | Nov. 20, 1894 |
| 2,067,741 | Weckerly | Jan. 12, 1937 |
| 2,371,040 | Fisher et al. | Mar. 6, 1945 |

FOREIGN PATENTS

| Number | Country | Date |
|---|---|---|
| 348,459 | Great Britain | May 14, 1931 |

OTHER REFERENCES

Reprint from analytical edition "Industrial and Engineering Chemistry," vol. 18, pg. 326, May 15, 1946.